Nov. 17, 1953     H. A. RUDOLPH     2,659,846
SELENIUM ELEMENT AND METHOD OF MAKING IT
Filed May 15, 1951
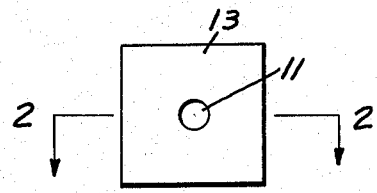
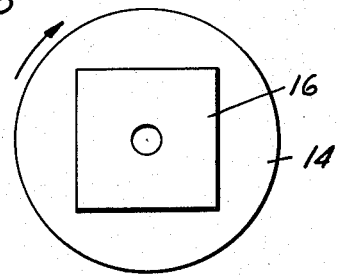
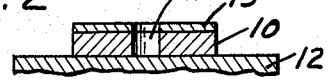
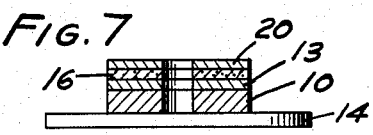
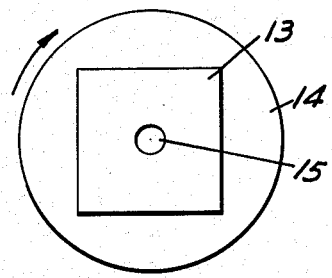
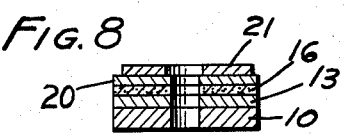
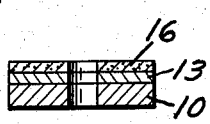
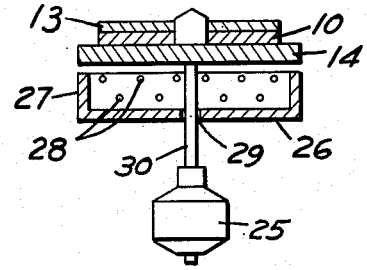
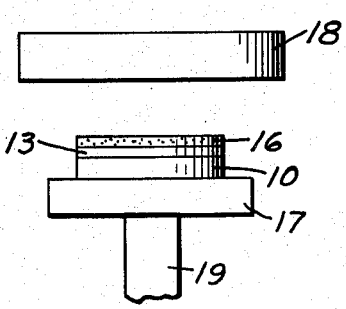
INVENTOR.
HANS A. RUDOLPH
BY
ATTORNEY.

Patented Nov. 17, 1953

2,659,846

UNITED STATES PATENT OFFICE 2,659,846

SELENIUM ELEMENT AND METHOD OF MAKING IT

Hans A. Rudolph, Hollywood, Calif., assignor to International Rectifier Corporation, Los Angeles, Calif., a corporation of California Application May 15, 1951, Serial No. 226,502

14 Claims. (Cl. 317—241)

1

This invention relates to selenium elements and particularly to such elements of the type useful in rectifiers or other selenium cells.

The object of this invention is to provide improved selenium elements and a method of making them.

A selenium element commonly comprises a metal base plate on which the selenium is coated or applied, and then crystallized. Then after the application of a counter-electrode over the selenium surface, a so-called barrier layer is created at the surface of the selenium by an electro-forming process. This barrier layer permits the rectifying action of the element.

Such selenium elements have limits of applied voltage beyond which they break down; and attempts have been made to increase their voltage-withstanding ability. In accordance with my present invention I am able to obtain selenium elements of higher voltage withstanding capability than formerly; and without deleteriously affecting the forward conductivity.

A feature of my invention is the provision of a plurality of layers of selenium of different halogen content. I prefer to do this by applying both layers in the amorphous form and then crystallizing both layers at the same time. This enables a layer of relatively little halogen to be next to the base plate, while the outer layer can have a relatively greater halogen content. The advantage of this resides in the fact that halogen improves the forward conductivity, although it does tend to reduce the voltage to which the unit can be formed. By using the double layer, the increased halogen in the outer layer will aid the forward conductivity, while the decreased halogen at the layer next the base plate will not allow the electro-forming to be hindered appreciably, and thereby will allow the element to be formed up to a considerable voltage withstanding ability.

This results in a cell capable of withstanding high voltage while still having good forward conductivity.

Another important feature of the invention resides in the blocking layer treatment involving treatment by a combination of organic and inorganic substances. The organic substance provides a very thin dielectric coating with good thermal resistance against breakdown; and owing to the thinness of the coating there is little impediment to the forward flow of current through it. The organic substance is preferably polystyrene; although other organic substances which might be used are such substances as ethyl

2 cellulose and phenol formaldehyde condensation products all of which have good heat resistance and good dielectric properties. The inorganic substance which I use is a magnesium compound. This treatment provides a barrier layer of improved dielectric strength, while still not seriously affecting the forward conductivity. This treatment is important in the high voltage achievement of the element.

The foregoing and other features of the invention will be better understood from the following detailed description and the accompanying drawing of which:

Fig. 1 is a plan view of a base plate on which a selenium element is formed according to my invention;

Fig. 2 is a cross-section view taken at line 2—2 of Fig. 1;

Fig. 3 is a plan view of the element of Figs. 1 and 2 on a turntable for further treatment;

Fig. 3a is a side view in cross-section of the arrangement of Fig. 3;

Fig. 4 is a cross-section view taken at the same line as the cross-section of Fig. 2, but including a second selenium layer;

Fig. 5 shows the element of Fig. 4 about to be placed in a press for heat and pressure treatment;

Fig. 6 shows the next step in the formation of the element, the element being removed from the press of Fig. 5 and placed on a turntable again;

Fig. 7 is a cross-section view showing the element with a blocking layer over the upper selenium layer in accordance with this invention; and Fig. 8 is a cross-section view showing the element of Fig. 7 with the counterelectrode added.

Referring to Figs. 1 and 2 of the drawing, the element is made on a suitable base plate 10 which is ordinarily a sheet metal such as steel or aluminum or the like, usually provided with a central hole 11 for the purpose of assembling on a suitable mandrel. The sheet is shown square in shape although it will be understood that it can have some other shape, such as circular. The plate 10 preferably has its upper surface roughened as by sandblasting to aid in holding the selenium, and prior to the application of the selenium the upper surface of the plate should preferably be nickel-plated after it has been roughened. To apply the selenium, the plate 10 may be placed on a hot surface 12 such as the top of a stove which is heated to around 350° C. Amorphous selenium can be spread on the top of the plate, and as the temperature is above the melting point will readily flow at that temperature to form a selenium layer 13. After the application of the selenium in this manner, the hot plate 10 is preferably placed on a turntable 14 as shown in Figs. 3 and 3a, adapted to be rotated by a suitable motor 25: and to hold the plate in position on the turntable, the turntable is preferably provided with an axial pin 15 to pass through the hole 11. The turning of the turntable spreads the molten selenium uniformly over the plate 10. Preferably the turntable is provided with heating means to keep the selenium in molten condition during the turning, and such heating means is especially desirable for larger plates. A heating arrangement is illustrated in the view shown in Fig. 3a, this comprising a circular dish arrangement 26 provided with a substantially cylindrical side 27 containing coils or wires 28 through which an electric heating current can be made to flow; and by this arrangement the dish will hold the heat beneath the turntable to heat the turntable material which can conveniently be copper. This dish can conveniently be provided with a central hole 29 through which the shaft 30 of the motor can extend.

The turntable can be rotated at about 150 R. P. M. depending somewhat on the size of the plate 10. This speed is good for plates of about 5″ by 5″ dimension. For larger plates a slower speed should be used and for the smaller plates a somewhat faster speed could be used. It may take from a few seconds to a minute to spread the selenium uniformly. Then the plate is removed and allowed to cool and thus solidify.

The selenium used for layer 13 should have in it a small proportion of halogen, which may be chlorine, bromine, or iodine. Bromine is very satisfactory. A suitable proportion would be from .006% to 0.01% by weight of the selenium in the layer. The proportion will depend somewhat on the particular halogen selected. .006% bromine has been found satisfactory.

A second layer 16 of selenium will now be applied as shown in Fig. 4 and this should have a somewhat greater proportion of halogen in it than the first layer 13. A suitable proportion of halogen for the layer 16 is about 0.01% to 0.02% based on the weight of the selenium in the layer; and here again the best proportion will depend on the particular halogen used. 0.01% bromine has been found satisfactory. The layer 16 is uniformly spread in the form of amorphous selenium powder which will be made to adhere to the first layer 13 by compacting it in a press as shown in Fig. 5.

The press may conveniently comprise a base plate 17 and an upper press plate 18: and on the lower press plate there is placed the selenium coated plate 10. Then the two press plates will be brought together to compact the selenium, which operation may be done by action on the stem or plunger 19 of the lower press plate.

After placing the selenium-coated plate 10 in the press, a pressure is applied, which may be in the order of about 900 pounds per square inch; and the press temperature during this operation should be about 125° C. This heat-pressure operation may last for about 9 or 10 minutes or more. This will serve to produce nucleation of the selenium in both layers, and form a compact hard layer 16 when the element is taken out of the press.

After removal from the press, the element should be annealed which can be done by placing it in an oven at a temperature of about 205° C. for a time of about one to two hours. This will serve to crystallize the selenium in the layers to condition it for use as a rectifier.

Following the annealing, the upper surface of the selenium layer 16 is treated to produce a good blocking layer. This treatment can conveniently be carried on while the selenium-coated plate is being rotated again on a turntable as indicated in Fig. 6; and for this purpose I use a convenient speed of rotation. 1700 R. P. M. is a good speed for the size element indicated above, although the exact speed is not critical. While the turntable is thus being rotated I pour on the upper selenium surface a solution of a magnesium compound. This should be a magnesium compound which is soluble in a solvent having the property of wetting the selenium surface. Magnesium compounds which include halogen are generally undesirable because they would put too much halogen at the selenium surface where it is not wanted. And furthermore they are inclined to be hygroscopic. I prefer to use a magnesium nitrate solution. This may conveniently be about 1% by weight magnesium nitrate $$Mg(NO_3)_2 \cdot 6H_2O$$

dissolved in a suitable solvent such as denatured alcohol. Other possible solvents could be butyl alcohol, isopropyl alcohol or acetone, provided the magnesium compound which is used is soluble in it. The turning of the turntable serves to spread the magnesium nitrate over the surface and also to aid in drying.

When the plate is dry, it is removed from the turntable and dipped in a hydroxide solution. This may for example be calcium or sodium or potassium hydroxide. I prefer, however, to use calcium hydroxide, $Ca(OH)_2$, which has the advantage over the sodium or potassium hydroxide of not forming water soluble substances, which if present would tend to pick up moisture from the air and cause undesirable aging of the cell. The hydroxide solution is preferably a saturated aqueous solution. After leaving the plate in the solution for about a minute, it is taken out and dried, and is then placed again on a turntable and spun again as shown in Fig. 6. While it is spinning there is dropped on it a solution containing an organic dielectric material, preferably polystyrene containing some selenium dioxide and an amine. As has been indicated, the organic substance can be some other substance than polystyrene providing it is capable of applying an extremely thin coating of good dielectric properties and good thermal resistance against breakdown, for example ethyl cellulose or phenol formaldehyde condensation product. The amine which is used may be diethanol amine, which is the preferred amine; although it should be understood that other amines may be used such as triethanol amine, ethylene diamine and the like. The alkalinity of the amine is beneficial to the rectifier element.

The organic solution can conveniently be the organic substance preferably polystyrene containing the selenium dioxide dissolved in solvent material which dissolves both the organic material and the selenium dioxide. The solvent for the organic material should be one which is compatible with the selenium dioxide and its solvent. Substances such as xylene and toluene are suitable for dissolving the polystyrene. Substances suitable for dissolving the selenium dioxide are the alcohols such as isopropyl alcohol or ethyl or methyl alcohol. Higher alcohol than propyl alcohol would probably not be as good. A satisfactory solution is about 0.1 part by weight of polystyrene containing some selenium dioxide in a solvent of about 70 parts by weight of xylene and 30 parts by weight of isopropyl alcohol. The use of other than the isopropyl alcohol would serve to change the proportion of the xylene which would be best for the purpose. In this polystyrene solution there is added the selenium dioxide and diethanol amine. A convenient amount is about 0.2%–0.4% by weight of selenium dioxide and about 0.02%–0.05% by weight of diethanol amine based on the weight of the entire solution of the polystyrene, xylene and alcohol. After the application of this liquid the plate is rotated until dry.

The extremely thin layer resulting from the foregoing treatment involving the organic material is represented by the layer 20 in Fig. 7.

After the foregoing treatment the element may then be removed from the turntable for the application of the usual counter-electrode which can be sprayed on in a well known manner. The counter-electrode, shown as layer 21 in Fig. 8, may be one of the high-melting alloys, such as for example, an alloy of about 42% by weight cadmium and 58% by weight bismuth. Following this, the unit is electro-formed by application of a voltage to its front and back electrodes, in the usual manner. The cell can thus be formed up to unusually high voltages, in the order of 70 volts or more.

It should be understood that in the drawing the layers on the plate are not drawn in proportion to their relative thickness; and ordinarily they will be considerably thinner than represented. The reason the layers are shown as thick as appears in the drawing is for ease of illustration.

The exceptionally high voltage obtainable is believed to be due to the improved dielectric strength of the blocking layer resulting from the treatment described. The magnesium nitrate and calcium hydroxide treatment is believed to form a basic magnesium compound (probably magnesium hydroxide) which is thought to react with the selenium to form a magnesium selenide; resulting in a very good blocking layer. It has been known that magnesium is useful for forming a good blocking layer, but in the previous attempts to use magnesium for this, it has tended to stop the flow of current in the forward direction. But in accordance with the present invention wherein it is used with the magnesium compound it not only forms a good blocking layer but it permits a substantially normal forward flow of current. The combination of this type of blocking layer with the polystyrene treatment produces the net effect of the extremely high voltage-withstanding capability.

The use of the double selenium layer of different halogen contents is especially advantageous. It is known that the halogen in the selenium serves to improve the forward conductivity of the rectifier, but it is also known that it tends to reduce the voltage to which the cell can be formed. Accordingly, the amount of halogen which has heretofore been used has been a compromise between the forward conductivity and the voltage-withstanding ability. An advantage of the double selenium layer having the different halogen contents in accordance with the present invention is that the layer having the least halogen can be put next to the base plate which is the place where a substantial amount of it would do the worst harm in hindering the electroforming to higher voltages.

It is particularly advantageous to produce nucleation and crystallization of the two amorphous selenium layers together as described hereinabove. Attempts to crystallize the two selenium layers separately have resulted in relatively poor forward conductivity. Apparently the separate nucleation and crystallizations of a plurality of layers add to the blocking effect in a forward direction.

It should be understood furthermore that the double selenium layers of different halogen content, annealed together, can be employed regardless of whether or not the particular blocking layer treatment disclosed herein is used. Conversely, the blocking layer treatment disclosed herein can be employed regardless of whether there are two selenium layers present.

I claim:

1. A selenium element comprising a base plate, a first selenium layer adherent to the base plate, a second selenium layer adherent over the first selenium layer, the second selenium layer comprising a barrier layer, a counter-electrode over the second selenium layer and barrier layer, each selenium layer having a halogen content, the proportion of the halogen in the second selenium layer being greater than the proportion of the halogen in the first selenium layer.

2. An element according to claim 1 in which the halogen content of the first selenium layer is from .006% to 0.01% by weight of the selenium in the layer and the halogen content of the second selenium layer is from 0.01% to 0.02% by weight of the selenium in the second selenium layer.

3. An element according to claim 1 in which the barrier layer contains selenium dioxide and comprises polystyrene and the reaction product of magnesium nitrate and a hydroxide.

4. An element according to claim 3 in which the reaction product comprises a magnesium selenide.

5. A selenium element comprising a base plate, selenium adherent to the base plate and a counter-electrode over the selenium, said selenium having a barrier layer at its surface next to the counter-electrode, said barrier layer comprising a thin coating containing an organic substance with dielectrical properties and thermal resistance against breakdown, and the reaction product of a magnesium compound and a hydroxide.

6. An element according to claim 5 in which the organic compound contains selenium dioxide.

7. An element according to claim 5 in which the organic compound is a substance from the group consisting of polystyrene, ethyl cellulose and phenol formaldehyde condensation product.

8. A selenium element comprising a base plate, and a plurality of selenium layers over the base plate, each of said selenium layers containing halogen, the layer next to the base plate having a smaller proportion of halogen than the next adjacent selenium layer.

9. The process of producing a selenium element which comprises coating a base plate with a first layer of molten amorphous selenium and allowing said amorphous selenium to solidify, then covering the selenium-coated plate with a second layer of amorphous selenium in the form of selenium powder and compressing both layers at a temperature and pressure high enough to produce nucleation in both layers at the same time and compact them, then crystallizing the selenium of the two layers, then applying a counter-electrode over the second layer.

10. The method according to claim 9 in which the surface of the second selenium layer is treated with a polystyrene solution and with magnesium nitrate and calcium hydroxide.

11. The method of making a selenium element which comprises placing on a base plate two layers of amorphous selenium, the first of which is made adherent to the base plate by applying the selenium in molten form and then solidifying it, and the second of which is in the form of selenium powder, compressing the two layers at an elevated temperature to produce nucleation in both layers at the same time and form them into compact layers, and then annealing the two selenium layers simultaneously.

12. The method of making a selenium element which comprises spreading a layer of molten amorphous selenium on a base plate, placing amorphous selenium powder over the first-mentioned layer, compacting the selenium powder to form a second layer adherent to the first mentioned layer, and annealing the two layers at a temperature of about 205° C.

13. The method of making a selenium element resistant to voltage breakdown which comprises spreading on a base plate a layer of molten amorphous selenium containing halogen and allowing said amorphous selenium to solidify, then spreading amorphous selenium powder containing a greater proportion of halogen than the first-mentioned layer, compacting the selenium powder to form a layer adherent to the first-mentioned layer and annealing the two layers simultaneously.

14. The method according to claim 13 in which the halogen content of the first-mentioned layer is from about .006% to 0.01% by weight of the selenium in said first-mentioned layer and the halogen content of the second-mentioned selenium layer is from about 0.01% to 0.02% by weight of the selenium in said second-mentioned layer.

HANS A. RUDOLPH.

References Cited in the file of this patent

UNITED STATES PATENTS

| Number | Name | Date |
|---|---|---|
| 2,156,660 | Van Geel | May 2, 1939 |
| 2,189,576 | Brunke | Feb. 6, 1940 |
| 2,227,827 | Dubar | Jan. 7, 1941 |
| 2,235,051 | Thompson | Mar. 18, 1941 |
| 2,334,554 | Hewlett | Nov. 16, 1943 |
| 2,349,622 | Hewlett | May 23, 1944 |
| 2,375,355 | Faharaeus | May 8, 1945 |
| 2,453,763 | Smith | Nov. 16, 1948 |

FOREIGN PATENTS

| Number | Country | Date |
|---|---|---|
| 629,869 | Great Britain | Sept. 29, 1949 |